No. 612,975. Patented Oct. 25, 1898.
C. E. PATTERSON.
POLE AND THILL BRACE.
(Application filed Jan. 27, 1898.)
(No Model.)
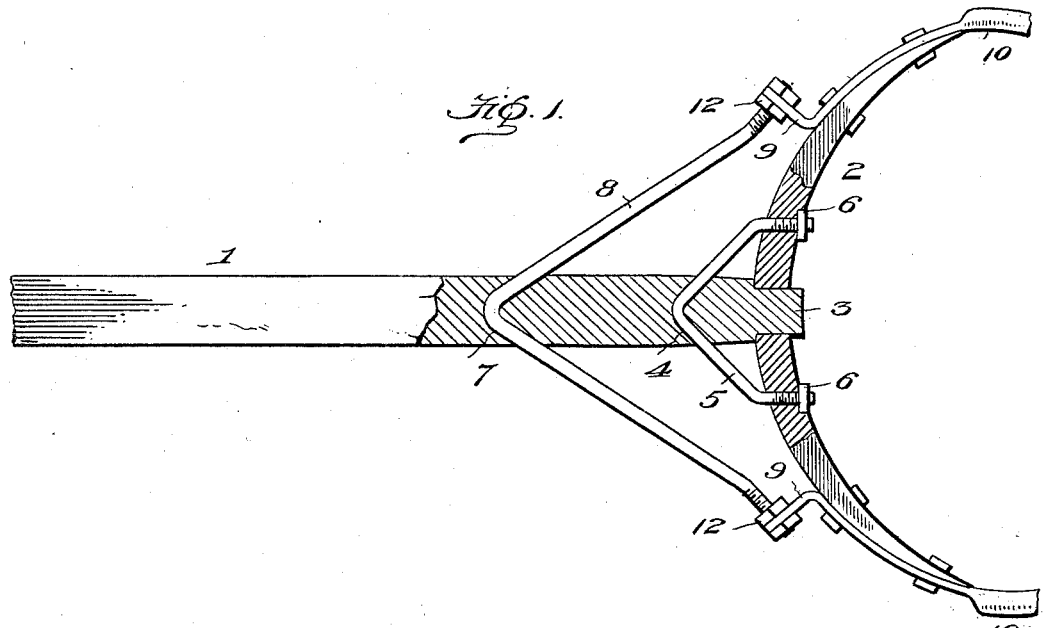
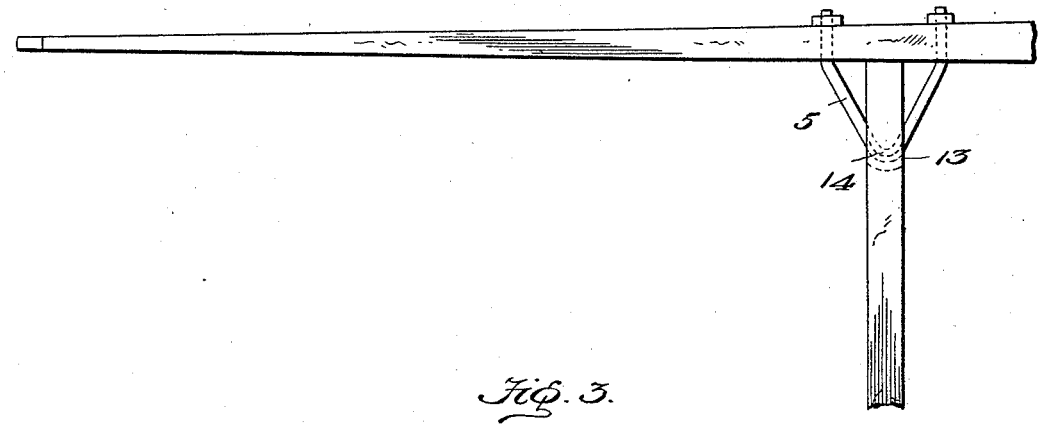
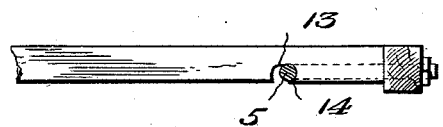
Witnesses
Inventor
C. E. Patterson

UNITED STATES PATENT OFFICE.

CHARLES E. PATTERSON, OF ARTESIAN, SOUTH DAKOTA.

POLE AND THILL BRACE.

SPECIFICATION forming part of Letters Patent No. 612,975, dated October 25, 1898.

Application filed January 27, 1898. Serial No. 668,201. (No model.)

*To all whom it may concern:*

Be it known that I, CHARLES E. PATTERSON, a citizen of the United States, residing at Artesian, in the county of Sanborn and State of South Dakota, have invented certain new and useful Improvements in Pole and Thill Braces; and I do declare the following to be a full, clear, and exact description of the invention, such as will enable others skilled in the art to which it appertains to make and use the same.

My invention relates to novel improvements in pole and thill braces for vehicles; and the object is to provide a simple, inexpensive, effective, and durable device of this character.

To this end the invention consists of the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention, as set forth in the claim at the end of this specification.

The same reference characters indicate the same parts of the invention in the several views.

Figure 1 is a horizontal section of a tongue or pole, showing my improved brace in position. Fig. 2 is a top plan view showing one of the braces applied to a vehicle-thill. Fig. 3 is a transverse section through the crossbar shown in Fig. 2.

1 denotes the pole, and 2 the "circle," which is formed with the usual mortise to receive the tenon 3 on the rear end of the pole 1. 4 represents a V-shaped groove formed in the lower face of the pole to receive the forward end of the V-shaped brace 5, the free diverging ends of which extend through the circle-bar 2, said ends being threaded to receive the nuts 6 6, so as to rigidly secure and at the same time laterally brace the pole in place. 7 denotes a second V-shaped groove also formed in the lower face of the pole to receive the forward end of the V-shaped brace 8, the free diverging threaded ends of which extend through the right-angular ears 9 9, formed on the forward ends of the thill-irons 10 10, and 12 12 represent jam-nuts adjustably secured to said threaded ends to rigidly secure and at the same time laterally brace the pole in place.

In Fig. 3 I have shown the brace 5 as applied to one of the thills of a pair of shafts, a similar brace being applied to the other thill and cross-bar. It will be noted that the V-shaped groove 13 in the cross-bar is recessed in cross-section, so as to form a lip 14 to assist in retaining the forward end of the brace in place.

A very important advantage is gained by forming the grooves with the lip 14, as shown in Fig. 3, for should the wood shrink and loosen the apex end of the brace the lip would still retain it in the groove, where of course it would rattle and thus direct attention to it.

Having thus fully described my invention, what I claim as new and useful, and desire to secure by Letters Patent of the United States, is—

The pole 1 formed with the V-shaped groove 7, the circle-bar 2 and the thill-irons 10 10 formed at their forward ends with the integral right-angular orificed ears 9 9 in combination with the V-shaped brace 8, having its forward end seated in said groove and its rear diverging threaded ends adjustably secured in said orificed ears 9 9, substantially as shown and described.

In testimony whereof I have hereunto set my hand in presence of two subscribing witnesses.

CHARLES E. PATTERSON.

Witnesses:
L. A. WHEELER,
GEO. F. ROSS.